May 20, 1958 R. O. BRADLEY 2,835,484
HYDRAULIC SCALE RECTANGULAR STABILIZING FRAME
Filed Oct. 19, 1953 2 Sheets-Sheet 1
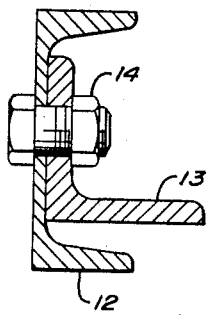
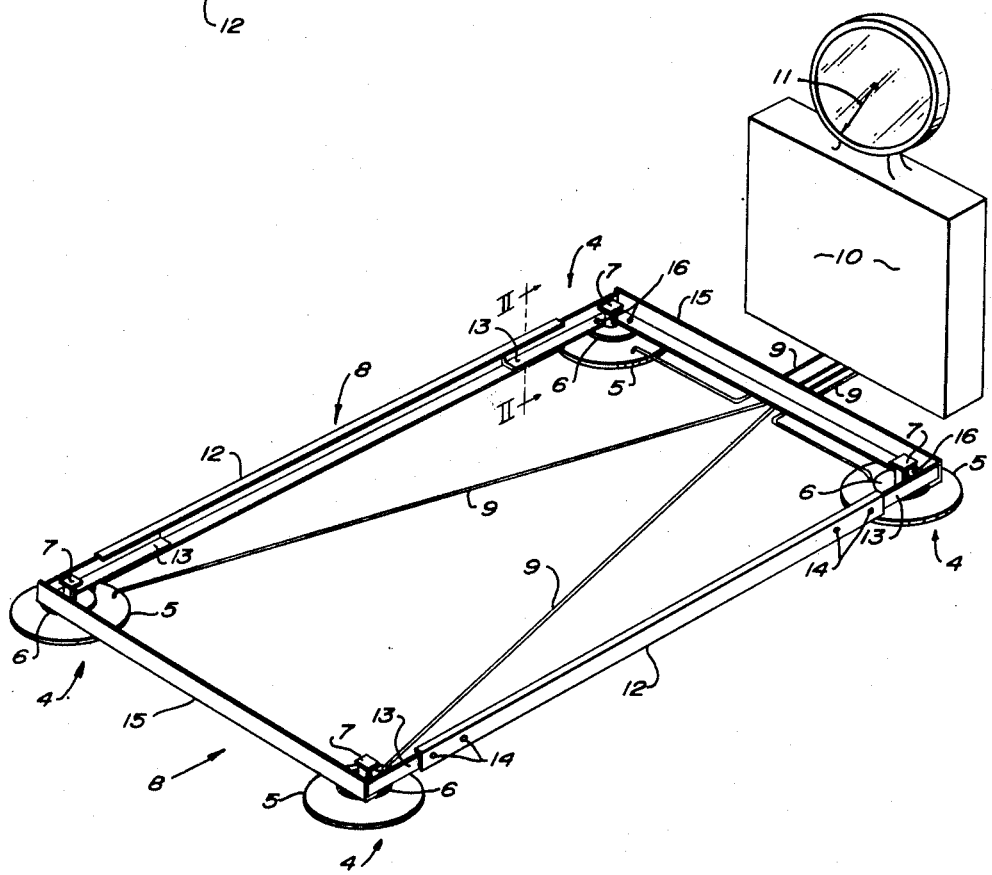
INVENTOR.
ROBERT O. BRADLEY
BY
Marshall, Marshall & Yeasting
ATTORNEYS

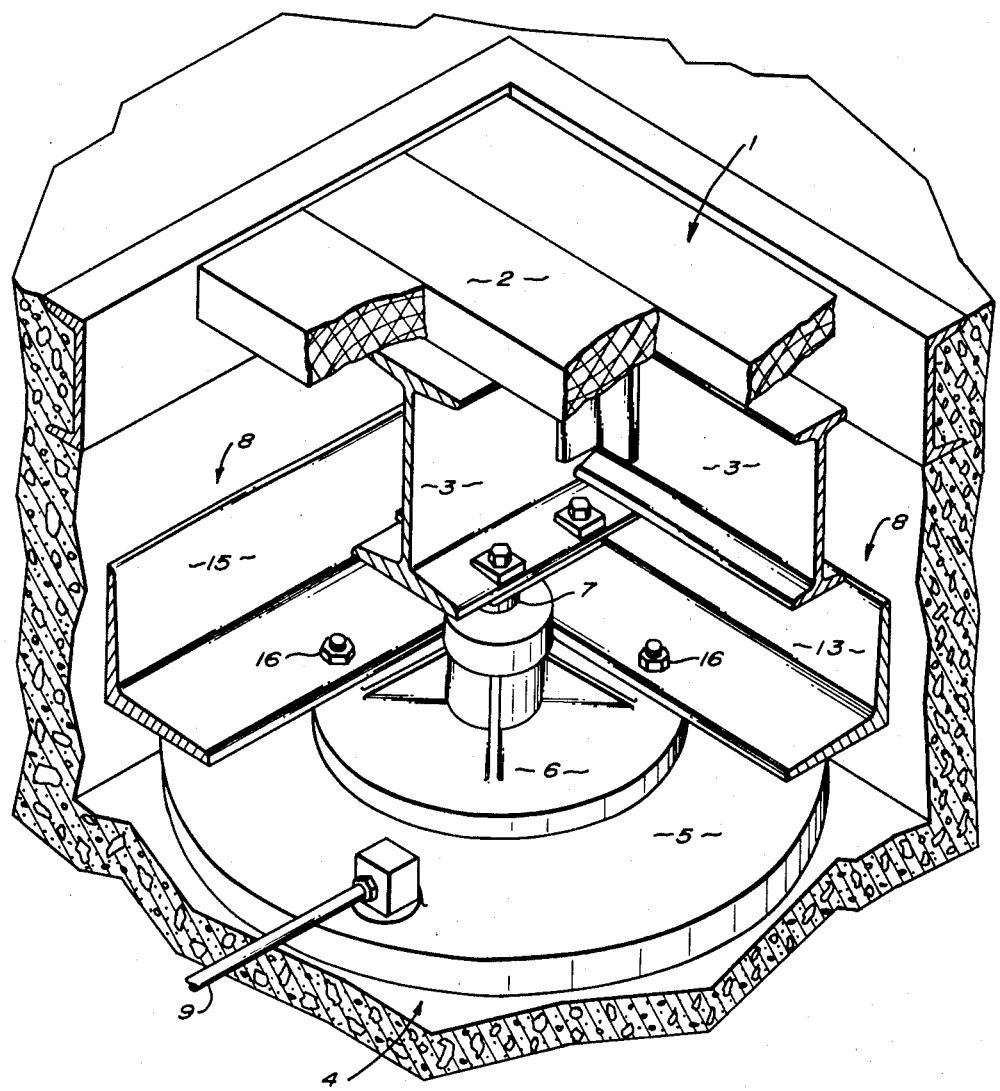
Fig. III

United States Patent Office 2,835,484
Patented May 20, 1958

2,835,484

HYDRAULIC SCALE RECTANGULAR STABILIZING FRAME

Robert O. Bradley, Toledo, Ohio, assignor, by mesne assignments, to Toledo Scale Corporation, Toledo, Ohio, a corporation of Ohio Application October 19, 1953, Serial No. 386,874

2 Claims. (Cl. 265—71)

This invention relates to hydraulic weighing scales and in particular to a structure for interconnecting and stabilizing the hydraulically supported tippable members of a plurality of hydraulic capsules.

In order to secure accurate indication of weight in a hydraulic weighing scale it is necessary that the hydraulic capsules, the elements which translate load force into hydraulic pressure, be extremely accurate in area and be sufficiently flexible for movement in a vertical direction so that, within the operating range, the load force is supported solely by the hydraulic pressure that is developed within the capsules. To satisfy these requirements it is necessary that a reinforcing membrane serving as a flexible connection and fluid seal between the upper tippable part and the lower part of the capsule be made quite thin and flexible.

In a weighing scale incorporating hydraulic force transmission capsules each comprising a hydraulically supported tippable member, the hydraulically supported member tips when loads are concentrated in the center of the load receiver causing bending of the girders supporting the load receiver or when horizontally directed forces cause lateral movement of the load receiver, such as those forces as are produced when trucks and automobiles are driven onto or from the platform of the weighing scale, and the weight indications change accordingly. The change in indication appears to result from the change in projected area of the capsule diaphragm as it is tipped, but the effect is complicated by the spring effect of the membranes of the capsules and the side forces introduced by the tipping.

Heretofore, it has been customary to rigidly interconnect the tippable members of the several capsules of a hydraulic weighing scale by means of a generally H-shaped frame. However, it has been found that such an H-shaped frame twists when the scale is eccentrically loaded, particularly when the load consists of an automobile or truck driven onto or from the platform of the scale. Since the arms of an H-shaped frame are weak in torsion, the hydraulically supported tippable members of the capsules to which such a frame is connected are tipped when the H-shaped frame is twisted by the bending of the girders supporting the load receiver of the scale when a concentrated load is placed on the center of the load receiver or when side forces tend to laterally displace the load receiver.

The principal object of this invention is to structurally interconnect the hydraulically supported tippable members of a plurality of load supporting capsules so that the tippable members are restrained from tipping under the influence of eccentrically applied loads.

Another object of the invention is to provide a lightweight rigid framework for interconnecting and stabilizing the hydraulically supported tippable members of a plurality of load supporting capsules which framework is exceptionally strong in the directions in which it is stressed by forces acting upon such tippable members and which framework may be assembled with or removed from the tippable members without disturbance of the load receiver on the capsules.

The invention consists in providing, in a weighing scale employing hydraulic force transmitting elements including a plurality of capsules each having a hydraulically supported member and rockable means jointly supporting a load receiver, means for stabilizing each capsule against tipping of its hydraulically supported member comprising a pair of bars rigidly attached to the hydraulically supported member of the capsule and connected one to each of similar parts of separate capsules of said plurality of capsules.

A specific embodiment illustrating a preferred form of the invention is illustrated in the drawings.

In the drawings:

Figure I is a schematic view of a hydraulic scale with its load receiver removed in which the hydraulically supported tippable members of a plurality of capsules are interconnected and stabilized by means of a plurality of longitudinally stiff bars.

Figure II is a vertical sectional view taken along the line II—II of Figure I.

Figure III is a perspective view, with parts broken away and parts shown in section, of a corner of a hydraulic weighing scale in which the corner of the load receiver is supported by a hydraulic capsule provided with rockable means, the tippable part of the capsule being rigidly attached to a stabilizer frame.

The specific figures and the accompanying description are intended merely to illustrate the invention and not to impose limitations on the claims.

In a hydraulic weighing scale embodying the invention, a load receiver 1 having a deck 2 supported on longitudinal stringers 3 is supported at its corners by a plurality of hydraulic capsules 4. Each of the load supporting capsules 4 includes a lower stationary member 5 and a hydraulically supported upper tippable member 6. Each upper or tippable member 6 supports a rockable member 7 to which the longitudinal stringers 3 are rigidly attached (Figure III) and is connected to similar parts of the other capsules 4 by means of a rectangularly shaped stabilizer frame or interconnecting frame 8 (Figure I).

Loads applied to the load receiver 1 are transmitted to the capsules 4 and there converted into hydraulic pressure which is transmitted through individual pressure lines 9 to a plurality of pressure receivers within the cabinet 10 which receivers convert the hydraulic pressure to a mechanical force the magnitude of which is shown by the indicator 11.

When hydraulic force transmitting elements are employed in a weighing scale, it is highly desirable that all of the load force applied to the hydraulic load supporting elements, such as the capsules 4, be converted into hydraulic pressure and that none of the force be supported by the mechanical elements of the capsules. It is also necessary that the effective area of the capsules shall remain constant regardless of the manner in which the load receiver is loaded or the magnitude of the forces applied to the capsules. If the hydraulically supported members 6 are allowed to tip as loads are applied, their effective area changes and consequently their force transmission ratios also change. Since the tipping is a function of the distribution of the load rather than the magnitude of the load, it is impossible to adjust the overall calibration of the weighing scale to compensate for the tipping of the hydraulically supported members. The change in indication as the distribution of a load on the load receiver of a hydraulic scale is changed is apparent when the hydraulically supported members of the capsules are rigidly attached to the girders of the load receiver or are connected in a manner such that they remain parallel to the girders of the load receiver at all times.

It has been customary to correct this unsatisfactory condition by providing rockable systems, such as the rockable members 7, between the load receiver and the hydraulically supported tippable members of the capsules, which systems are incapable of transmitting a bending moment to the hydraulically supported members. Since such a rockable system robs the hydraulically supported members of support against rotation or tipping afforded by the girders of the load receiver, it is necessary to provide other means to support the hydraulically supported members of the capsules against tipping forces produced by eccentric loading of the load receiver.

According to the invention, the additional support is provided by a plurality of longitudinally stiff bars rigidly attached two to each tippable member of the capsules so arranged that each capsule is connected to at least two adjacent capsules.

The plurality of longitudinally stiff bars forming a stabilizer frame 8 (Figure I) comprises two bars 12 which may be channel irons or other shape. Each bar 12 has an extension bar or angle iron 13 bolted to each of its ends by means of bolts 14. The extension bars 13 are attached one to each of the tippable members 6 of the capsules 4 remote from the bolts 14 and transverse bars 15 are attached to the tippable members 6, both the extension bars 13 and the transverse bars 15 being attached to the tippable members by means of bolts 16, to interconnect the ends of the extension bars 13 to prevent rotation of each bar and stabilize the tippable members 6.

Although the transverse bars 15 are shown inter-connecting the ends of the extension bars 13 in Figure I, it is not necessary that the bars themselves be interconnected. The capsules 4 would be effectively stabilized if the bars of the stabilizer frame 8 were rigidly attached two to each tippable member 6 of the capsules 4 so that each capsule would be connected to at least two adjacent capsules. In such a case, the plurality of bars forming the stabilizer frame 8 would form the same general rectangular shape as shown in Figure I, except that the ends of the bars would be attached only to the tippable members 6.

The bars 12 together with their extension bars 13 and the transverse bars 15 form a generally rectangularly shaped frame stabilizing four capsules, as illustrated in Figure I. However it is not necessary that the plurality of capsules be limited to four. For example, the plurality of capsules may be three to accommodate a polygonal load receiver in the form of a triangle. In such a configuration, the bars of the stabilizer frame would also form a triangle.

By employing a stabilizer frame built in sections, it is possible to completely assemble the capsules 4 and the rockable members 7 mounted thereon before the sections of the stabilizer frame are put in place, and in the event that the capsules must be removed from service and replaced, the stabilizer frame may be assembled to or removed from the capsules by movement perpendicular to the bars or sections of the stabilizer frame without dissembling of the load supporting structure.

Various modifications and changes in the details of construction may be made without departing from the spirit and scope of the invention.

Having described the invention, I claim:

1. In a hydraulic weighing scale, in combination, a plurality of hydraulic capsules, a load receiver including a rigid supporting frame rockably supported upon the plurality of capsules, said capsules each comprising a tippable member, and a stabilizing frame independent of the load receiver for preventing tipping of the tippable members of the capsules, said stabilizing frame comprising a plurality of longitudinally stiff bars rigidly attached two to each tippable member of the capsules, each capsule being connected to at least two relatively adjacent capsules and there being an end of two bars adjacent each one of the tippable members.

2. In a weighing scale employing hydraulic force transmitting elements including a plurality of capsules each having a hydraulically supported member and means for supporting a load receiver including a rigid supporting frame from the member, means independent of the load receiver for stabilizing each capsule against tipping of its hydraulically supported member, said stabilizing means comprising a plurality of bars rigidly attached to the hydraulically supported member of the capsule and connected one to each of similar parts of separate capsules of said plurality of capsules, there being an end of two bars adjacent each of the hydraulically supported members and a sufficient number of said bars including a plurality of sections rigidly attached to each other whereby the bars may be assembled to or removed from the hydraulically supported members of the capsules without disturbance of the load receiver on the capsules.

References Cited in the file of this patent

UNITED STATES PATENTS

| | | |
|---|---|---|
| 2,403,204 | Feld | July 2, 1946 |
| 2,501,247 | Williams | Mar. 21, 1950 |
| 2,510,535 | Williams | June 6, 1950 |
| 2,646,236 | Williams | July 21, 1953 |
| 2,666,634 | Williams | Jan. 19, 1954 |
| 2,668,702 | Belknap | Feb. 9, 1954 |